United States Patent
Song et al.

(10) Patent No.: US 9,658,390 B2
(45) Date of Patent: May 23, 2017

(54) LIGHT SOURCE COVER INCLUDING GROOVE AND BACKLIGHT ASSEMBLY INCLUDING THE LIGHT SOURCE COVER

(71) Applicant: Samsung Display Co., Ltd., Yongin, Gyeonggi-Do (KR)

(72) Inventors: Young Dae Song, Busan (KR); Sung Dong Park, Asan-si (KR); Sang Hwan Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 304 days.

(21) Appl. No.: 14/599,614

(22) Filed: Jan. 19, 2015

(65) Prior Publication Data
US 2015/0369992 A1 Dec. 24, 2015

(30) Foreign Application Priority Data
Jun. 20, 2014 (KR) .................. 10-2014-0075397

(51) Int. Cl.
*F21V 8/00* (2006.01)
(52) U.S. Cl.
CPC .......... *G02B 6/009* (2013.01); *G02B 6/0045* (2013.01); *G02B 6/0073* (2013.01); *G02B 6/0083* (2013.01); *G02B 6/0091* (2013.01)
(58) Field of Classification Search
CPC .... G02B 6/009; G02B 6/0045; G02B 6/0073; G02B 6/0083; G02B 6/0091; G02B 6/0066; G02B 6/0086; G02B 6/00; G02B 6/0011; G02F 1/133615; F21V 2200/00; F21V 2200/20; F21S 4/005; F21Y 2103/30
See application file for complete search history.

(56) References Cited

U.S. PATENT DOCUMENTS

| | | | | |
|---|---|---|---|---|
| 9,069,113 B2* | 6/2015 | Kim | ............... | G02B 6/0093 |
| 9,091,798 B2* | 7/2015 | Yoon | ............... | G02B 6/0068 |
| 9,389,359 B2* | 7/2016 | Hsiao | ............... | G02F 1/133308 |
| 2010/0315811 A1* | 12/2010 | Chen | ............... | F21V 13/04 |
| | | | | 362/235 |
| 2011/0199558 A1* | 8/2011 | Hamada | ............... | G02B 6/002 |
| | | | | 349/62 |
| 2015/0219940 A1* | 8/2015 | Kim | ............... | G02F 1/1336 |
| | | | | 362/612 |

FOREIGN PATENT DOCUMENTS

| | | |
|---|---|---|
| JP | 2012078838 A | 4/2012 |
| KR | 1020080082359 A | 9/2008 |
| KR | 202009009047 U | 9/2009 |
| KR | 1020110066790 A | 6/2011 |
| KR | 1020130044136 A | 5/2013 |

* cited by examiner

*Primary Examiner* — Bao Q Truong
(74) *Attorney, Agent, or Firm* — Cantor Colburn LLP (57) ABSTRACT

A backlight unit includes a light source unit which has a curved shape, a light guide plate including a curved light incident surface on which light emitted from the light source unit is incident, and a light source cover which has a curved shape corresponding to the curved light incident surface and is configured to surround one side of the light guide plate to dispose the light source unit and the light incident surface inside thereof. A groove is defined in the light source cover and extends toward the inside of the light source cover from an edge portion thereof.

12 Claims, 5 Drawing Sheets

LIGHT SOURCE COVER INCLUDING GROOVE AND BACKLIGHT ASSEMBLY INCLUDING THE LIGHT SOURCE COVER

This application claims priority to Korean Patent Application No. 10-2014-0075397, filed on Jun. 20, 2014, and all the benefits accruing therefrom under 35 U.S.C. §119, the content of which is incorporated herein in its entirety by reference.

BACKGROUND

1. Field

Exemplary embodiments of the invention relate to a backlight unit used in a curved surface display device, which is capable of improving surface flatness of a light source cover.

2. Description of the Related Art

A liquid crystal display ("LCD") is a type of flat panel display ("FPD"), which is most widely used as a display device. The LCD includes two substrates on which an electric field generating electrode such as a pixel electrode and a common electrode is disposed, and a liquid crystal layer interposed between the two substrates. In the LCD, a voltage is applied to the electric field generating electrode so that liquid crystal molecules of the liquid crystal layer are rearranged, thereby adjusting the amount of transmitted light.

LCDs are used as a display device in a wide range of applications including televisions and also are available in a wide range of screen sizes. Depending on positions at which a viewer sees a central portion of a screen or left and right end portions thereof, a visual disparity becomes disadvantageously larger as the screen size of LCDs is increased.

In order to compensate for the visual disparity, a curved surface display device has been developed, of which a surface is curved in a partial-circle profile extending from a central portion of a display area to each of opposing sides of the central portion.

The curved surface display device can be classified into two categories: a portrait type that has a longer vertical length than a horizontal length from the viewpoint of a viewer and is curved in a vertical direction, and a landscape type that has a longer horizontal length than a vertical length from the viewpoint of a viewer and is curved in a horizontal direction.

The curved surface display device includes a backlight unit that is curved to fit a shape of a curved surface thereof. The backlight unit is classified into three types: a direct type, an edge type and a corner type, based on the position of a light source.

SUMMARY

A curved surface display device in landscape mode, such as implemented in televisions, includes an edge type backlight unit so as to reduce left side and right side bezel widths. A light source included in the backlight unit faces a curved light incident surface of a light guide plate. A light source cover having a curved shape is mounted on one side of the light guide plate for accurate alignment between the curved light incident surface and the light source.

However, a conventional curved light source cover disadvantageously is not smoothly curved and is considered to have a relatively "rough" surface, such as taken along a length thereof. That is, the conventional curved light source cover has different deformations between an inner side surface and an outer side surface thereof, and thus the profile of the surface of the conventional light source cover is not evenly smooth or does not evenly transition along the curved shape thereof (e.g., is considered "rough").

Accordingly, due to surface roughness of the non-smooth light source cover, the light source cover fails to be firmly coupled to the light guide plate such that light sources included in the light source cover cannot be accurately aligned with a light incident surface of the light guide plate. In such a case, light emitted from the light sources cannot be properly transmitted to the light guide plate, thereby decreasing luminous efficacy and also causing low visibility of a screen.

One or more exemplary embodiment of the invention is directed toward a backlight unit capable of reducing uneven defects occurring where a surface of a light source cover is relatively rough or a curved profile thereof is not smooth.

According to an exemplary embodiment of the invention, a backlight unit includes a light source unit having a curved shape, a light guide plate including a curved light incident surface on which the light emitted from the light source unit is incident, and a light source cover which has a curved shape corresponding to the curved light incident surface, and is configured to surround one side of the light guide plate and to dispose the light source unit and the light incident surface inside thereof. A groove is defined in the light source cover and extends toward the inside of the light source cover from an edge portion thereof.

The groove may have a wedge, a circle, a quadrilateral or a trapezoid shape.

The light source cover may include a light source installation part to which the light source unit is mounted, an upper extending part extending from an upper side of the light source installation part toward an upper surface of the light guide plate, and a lower extending part extending from the lower side of the light source installation part toward a lower surface of the light guide plate.

The groove extends from an edge portion of the upper extending part or an edge portion of the lower extending part.

The lower extending part may include a first horizontal part extending from the lower side of the light source installation part, a second horizontal part disposed nearer the lower surface of the light guide plate than the first horizontal part, and an inclined part configured to couple the first and second horizontal parts to each other.

The groove may extend from an edge portion of the second horizontal part.

The groove may be provided in plural and distributed only in a central portion of the light source cover.

The groove may be provided in plural and evenly distributed along an entire length of the light source cover.

The light source unit may include a printed circuit board ("PCB") having a curved shape, and on which a plurality of conductive lines are mounted, the conductive lines configured to transmit drive power from a power supply unit, and a light-emitting diode package mounted on the PCB and configured to produce light by the drive power transmitted through the plurality of conductive lines.

The backlight unit may further include an adhesive member between a surface of the printed circuit board and a surface of the light source cover, which face each other.

According to exemplary embodiment of the invention, a backlight unit has the following effect.

According to one or more exemplary embodiment of the invention, a groove defined in a light source cover enables reduction of deformation deviations between inner and outer side surfaces of the light source cover. Therefore, even though the light source cover is curved corresponding to the curved light incident surface of a light guide plate, the surface or profile along a length of the curved light source cover can be smooth.

The foregoing summary is illustrative only and is not intended to be in any way limiting the claims of the invention. In addition to the illustrative embodiments and features described above, further embodiments and features will become apparent by reference to the drawings and the following detailed description.

BRIEF DESCRIPTION OF THE DRAWINGS

The above and other features of the invention will be more clearly understood from the following detailed description taken in conjunction with the accompanying drawings, in which.

DETAILED DESCRIPTION

Advantages and features of the invention and methods for achieving thereof will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

The spatially relative terms "lower," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "lower" another device may be placed "upper" another device. Accordingly, the illustrative term "lower" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of a backlight unit according to the invention will be fully described with reference to FIGS. 1 to 3. The names of elements used in the description hereinafter may be selected in consideration of ease of description of a specification and may be different from the names of the components of the actual product.

Figure 1:
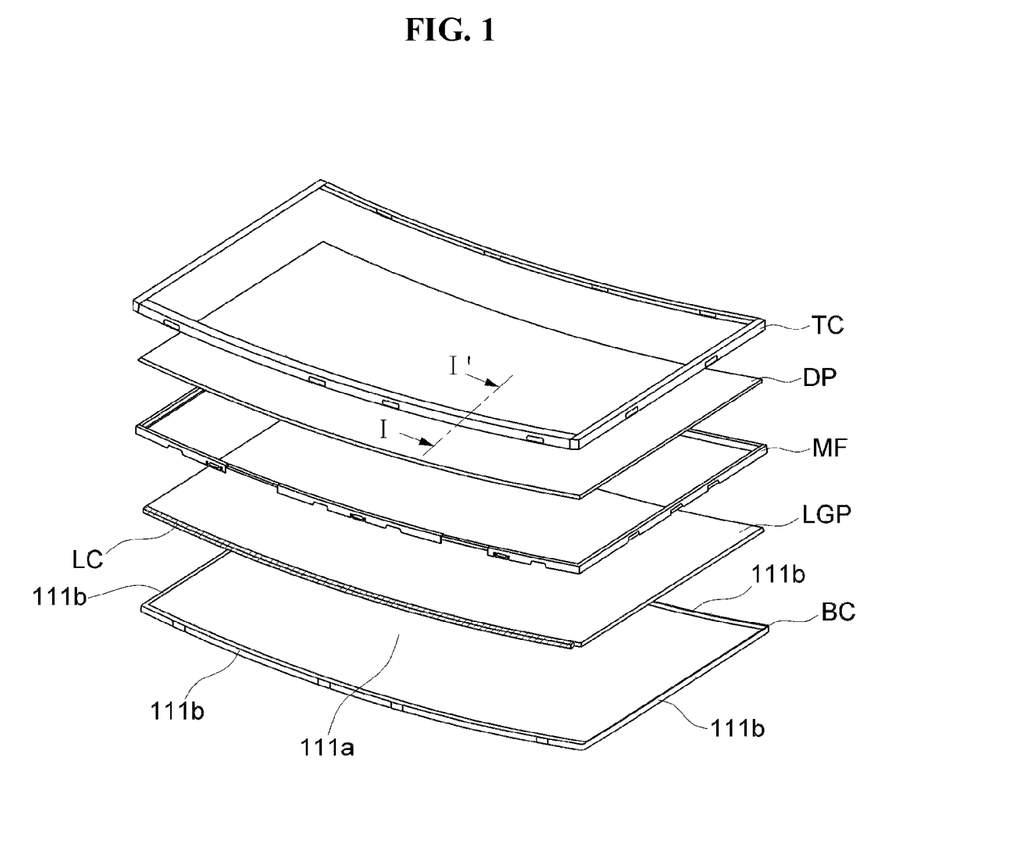
FIG. 1 is an exploded perspective view illustrating an exemplary embodiment of a display device including a backlight unit according to the invention.

FIG. 1 is an exploded perspective view illustrating an exemplary embodiment of a display device including a backlight unit according to the invention. FIG. 2 is a cross-sectional view taken along line I-I' of FIG. 1.

According to one or more exemplary embodiment, a display device is a curved display device of which a surface thereof is curved in a partial-circle profile extending from a central portion of a display area to opposing sides thereof.

Figure 2:
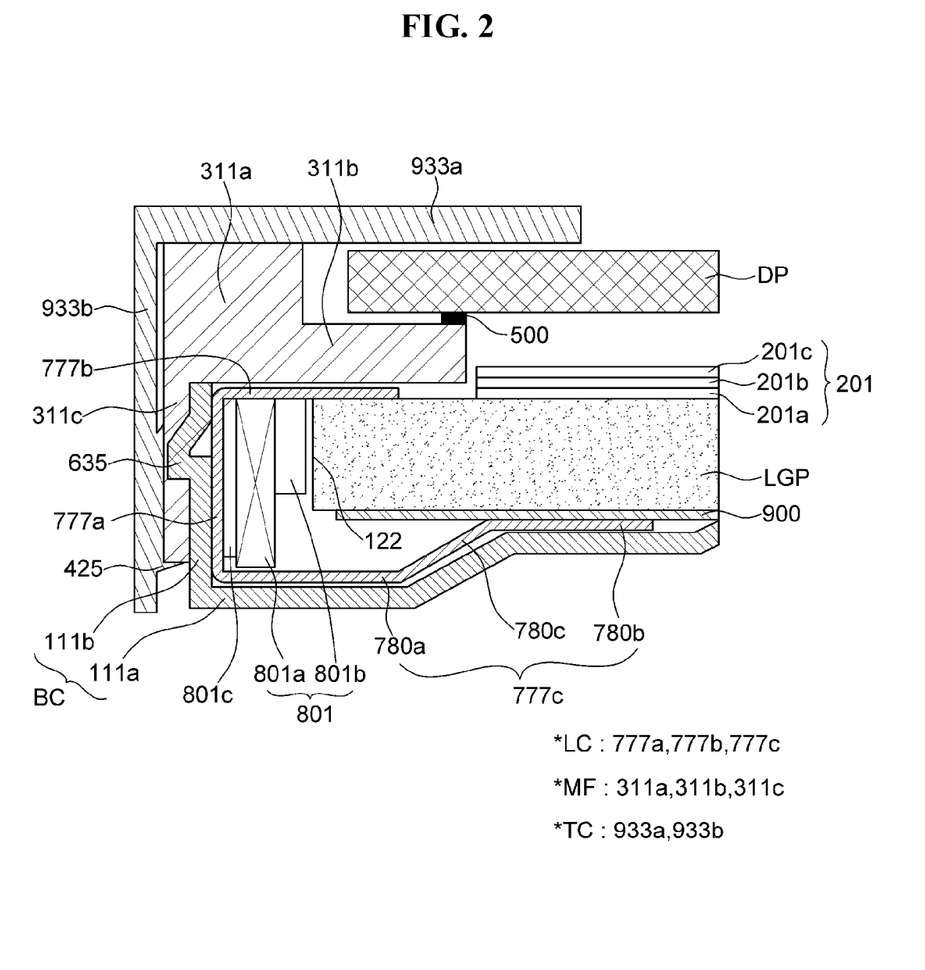
FIG. 2 is a cross-sectional view taken along line I-I' of FIG. 1.

The curved surface display device may include a bottom chassis BC, a reflector 900, a light guide plate LGP, an optical sheet 201, a light source unit 801, a light source cover LC, a mold frame MF, a display panel DP and a top chassis TC as illustrated in FIGS. 1 and 2. The above enumerated components may be curved in a shape or profile to fit the overall curved surface of the display device. The reflector 900, light guide plate LGP, optical sheet 201, light source unit 801, light source cover LC and mold frame MF may collectively be included in a backlight unit according to one exemplary embodiment, but the invention is not limited thereto. The display panel DP and the backlight unit may be assembled into a collective laminated structure so as to form a display module. The display module may further include the top chassis TC and the bottom chassis BC that are configured to protect and fix the display panel DP and the backlight unit. The display module may also include a driver circuit board (not shown) configured to drive the display panel DP.

The display panel DP may display an image. The display panel DP may be partitioned broadly into two portions: a display portion and a non-display portion. An image may be displayed in the display portion. Signal lines may be disposed in the non-display portion so as to transmit image data, control signals and/or power signals, which are required for the image display. All or part of driver circuits may be further disposed in the non-display portion or the driver circuit board (not shown) so as to supply the image data, control signals and power signals.

As illustrated in FIG. 1, the display panel DP may be quadrangular in shape in a top plan view. With reference to the quadrangular shape, two sides that are relatively long in length (hereinafter referred to as "long sides") may be curved in a cross-sectional (thickness) view, whereas the other two sides that are relatively short in length (hereinafter referred to as "short sides") may be straight, e.g., not curved, in the cross-sectional (thickness) view. In an alternative exemplary embodiment, the long sides may be straight and the short sides may be curved.

According to one or more exemplary embodiment, the display panel DP may be a liquid crystal display panel, but the invention is not limited thereto. In addition to the liquid crystal panel, any panel structure configured to display an image is available, such as an organic light emitting diode display panel.

The bottom chassis BC may include an accommodating space defined therein. The reflector 900, light guide plate 900, optical sheet 201, light source unit 801 and light source cover LC may be disposed in the accommodating space. In order to define the accommodating space, the bottom chassis BC may include a base portion 111a and a plurality of side portions 111b. In an exemplary embodiment, the base portion 111a may have a quadrangular shape in the top plan view and each of the plurality of side portions 111b may extend (or protrude) from respective edge portions of the base portion 111a to a predetermined height in the thickness direction. Edge (or end) portions of adjacent side portions 111b may be coupled to each other. A space surrounded by the side portions 111b and the base portion 111a may define the accommodating space of the bottom chassis BC.

Referring to FIG. 2, a locking projection 635 may be disposed on an outside of the side portions 111b opposing each other with respect to the base portion 111a, and the mold frame MF may be fixed to the bottom chassis BC by the locking projection 635. The locking projection 635 may be defined by a bent portion of the corresponding side portion 111b which protrudes outwardly toward the mold frame MF.

The light source unit 801 may be configured to produce light. As illustrated in FIG. 2, the light source unit 801 may include a printed circuit board ("PCB") 801a and at least one light source 801b. The PCB 801a may be curved to have a partial-circle shape.

Although not illustrated, a surface of the PCB 801a may be partitioned into at least one mounting area and a conductive line area. Where the light source unit 801 includes at least two light sources, the mounting area may be provided in plural such that one light source is disposed in each mounting area, and a plurality of conductive lines may be disposed in the conductive line area so as to transmit drive power to the light sources. A power for driving the light sources may be generated in an external power supply unit (not shown) and may be then supplied to the plurality of conductive lines through a separate connector (not shown).

The light source 801b may be configured to emit light outwards therefrom and may be disposed on the PCB 801a. The light source 801b may be a light-emitting diode ("LED") package that includes an LED. In an exemplary embodiment, for instance, one LED package may include a red LED generating and emitting red light, a green LED generating and emitting green light, and a blue LED generating and emitting blue light. The LED package may produce white light by combining (or mixing) three colors. In another exemplary embodiment, the LED package may include only the blue LED among the LEDs of the three colors and a phosphor may be disposed in a light emitting unit of the blue LED so as to convert the generated blue light to white light. Light emitted from the light source 801b may be incident on the light guide plate LGP.

As illustrated in FIGS. 1 and 2, the light guide plate LGP may have a shape of polyhedron having curved surfaces. Among a plurality of surfaces of the light guide plate LGP, one surface facing the light source may be set as a light incident (side) surface 122. The light incident surface 122 may have a curved shape in the cross-sectional thickness direction. Where a long side of the display panel DP is curved, the long side may be placed corresponding to the light incident surface 122 of the light guide plate LGP.

Light emitted from the light source 801b may be incident on the light incident surface 122 of the light guide plate LGP, and then, the light may propagate inside the light guide plate LGP. The light guide plate LGP may guide the light to the display portion of the display panel DP using total internal reflection. The guided light may exit through a light-emitting surface at an upper portion of the light guide plate LGP.

Although not illustrated, a plurality of scattering patterns may be further disposed on a lower outside surface of the light guide plate LGP opposite to the light-emitting surface so as to increase reflectivity of the light guide plate LGP. The distance between the scattering patterns may become larger as the scattering patterns are disposed farther from the light incident surface 122 of the light guide plate LGP in the top plan view.

The light guide plate LGP may include a light-transmissive material, e.g., an acrylic resin such as polymethylmethacrylate ("PMMA") or polycarbonate ("PC"), so as to guide light efficiently.

The reflector 900 may be disposed under the light guide plate LGP. The reflector 900 may reflect light passing through the lower outside surface of the light guide plate LGP and emitted outwards back into the light guide plate LGP, thereby reducing (or minimizing) light loss.

The optical sheet 201 may be disposed between the light guide plate LGP and the display panel DP. The optical sheet 201 may include a diffusion sheet 201a, a prism sheet 201b and a protective sheet 201c, but the invention is not limited thereto. The diffusion sheet 201a, prism sheet 201b and protective sheet 201c may be sequentially disposed such as to be laminated on the light guide plate LGP in the order in which they are enumerated. The diffusion sheet 201a may condense light guided by the light guide plate LGP, the prism sheet 201b may diffuse the light condensed by the diffusion sheet 201a, and the protective sheet 201c may protect the diffusion sheet 201a. The light passing through the protective sheet 201c may be provided to the display panel DP.

As illustrated in FIG. 2, the light source cover LC may surround one side of the light guide plate LGP so as to include the light source unit 801 and the light incident surface 122 in an accommodating space thereof. The light source cover LC may arrange (e.g., align) the light incident surface 122 and the light sources 801b so that light emitted from the light sources 801b may be incident accurately on the light incident surface 122 of the light guide plate LGP. Consequently, the light source cover LC may also have a curved shape. Where the light guide plate LGP includes a flexible material that does not maintain a specific shape, e.g., curved or bent shape, alone (by itself), the light source cover LC may apply a force to the light guide plate LGP to allow the light guide plate LGP to maintain a curved shape.

The light source cover LC may include a metal material such as stainless steel.

The light source cover LC may include a light source installation part 777a, an upper extending part 777b, and a lower extending part 777c.

The upper extending part 777b may extend from one edge portion of the light source installation part 777a to an upper outside surface of the light guide plate LGP.

The lower extending part 777c may extend from an opposing edge portion of the light source installation part 777a to a lower outside surface of the light guide plate LGP. The lower extending part 777c may have a variety of planar shapes according to the top plan view shape of the base portion 111a of the bottom chassis BC.

In an exemplary embodiment, as illustrated in FIG. 2, the lower extending part 777c may include a first horizontal part 780a extending from the opposing side of the light source installation part 777a to a predetermined length, a second horizontal part 780b disposed nearer a lower surface of the light guide plate LGP than the first horizontal part 780a, and an inclined part 780c configured to couple the first and second horizontal parts 780a and 780b to each other.

The light sources 801b and the PCB 801a may be disposed in an accommodating space surrounded by the light source installation part 777a, upper extending part 777b and lower extending part 777c.

An adhesive member 801c may be disposed on any surface among surfaces of the light source installation part 777a which faces a respective surface of the PCB 801a. The light source unit 801 may be bonded to the light source installation part 777a by the adhesive member 801c. The adhesive member 801c may be a double-sided tape and the light source unit 801 may be configured to include one adhesive side of the double-sided tape bonded to the PCB 801a.

At least one groove may be defined in a portion of the light source cover LC in order to achieve an even surface of the light source cover LC. A detailed description of the groove will be provided below with reference to FIG. 3.

The mold frame MF may support the display panel DP and the top chassis TC while being fixed to the bottom chassis BC and also may maintain a constant space between the display panel DP and the optical sheet 201. To perform the above functions, the mold frame MF may be shaped like a quadrangular frame that includes a first support part 311a, a second support part 311b and a fixing part 311c.

The first support part 311a may support a top chassis TC portion that covers (e.g., overlaps) the first support part 311a while being placed on the plurality of side portions 111b.

The second support part 311b may extend from an inner edge portion of the first support part 311a toward the optical sheet 201. The second support part 311b may be lower in cross-sectional height than the first support part 311a with respect to a common reference point (e.g., smaller in thickness). There may be a space between the top chassis TC and the second support part 311b because of the height difference between the first and second support parts 311a and 311b, and an edge portion of the display panel DP may be disposed in the space. A cushion pad 500 may be disposed on an end portion of the second support part 311b and the cushion pad 500 may protrude from the end portion to the display panel DP. The edge portion of the display panel DP may be placed on the cushion pad 500. The cushion pad 500 may reduce or effectively prevent direct contact between the display panel DP and the second support part 311b, thereby reducing scratches on the display panel DP.

The fixing part 311c may extend from a lower side of the first support part 311a toward the side portions 111b. A coupling groove may be defined extending from an inner surface of the fixing part 311c, namely a surface facing the locking projection 635, among surfaces of the fixing part 311c. The locking projection 635 may be fitted into the coupling groove so that the mold frame MF may be fixed to the bottom chassis BC.

The top chassis TC may be shaped like a quadrangular frame that covers only an edge portion (e.g., a non-display portion) of the front surface of the display panel DP. The top chassis TC may surround an upper surface and a side surface of the first support part 311a of the mold frame MF and a side surface of the fixing part 311c of the mold frame MF. To perform the above function, the top chassis TC may include an upper cover 933a configured to cover the upper surface of the first support part 311a and may also include a side cover 933b configured to cover the side surfaces of both the first support part 311a and of the fixing part 311c. A hook 425 may be disposed in an inner side of the side cover 933b and the hook 425 may be in contact with a lower surface of the fixing part 311c of the mold frame MF. The top chassis TC may be fixed to the mold frame MF by the hook 425.

Figure 3A:
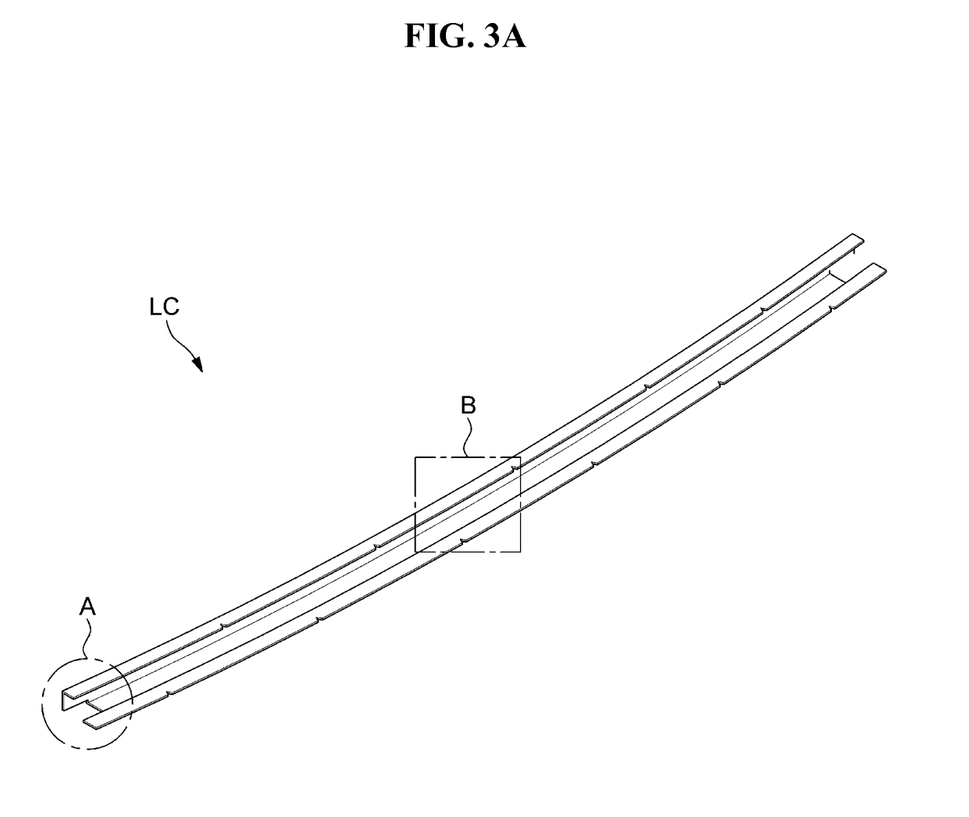
FIG. 3A and FIGS. 3B and 3C are perspective and enlarged views, respectively, showing an exemplary embodiment of a light source cover illustrated in FIG. 1.
Figure 3B:
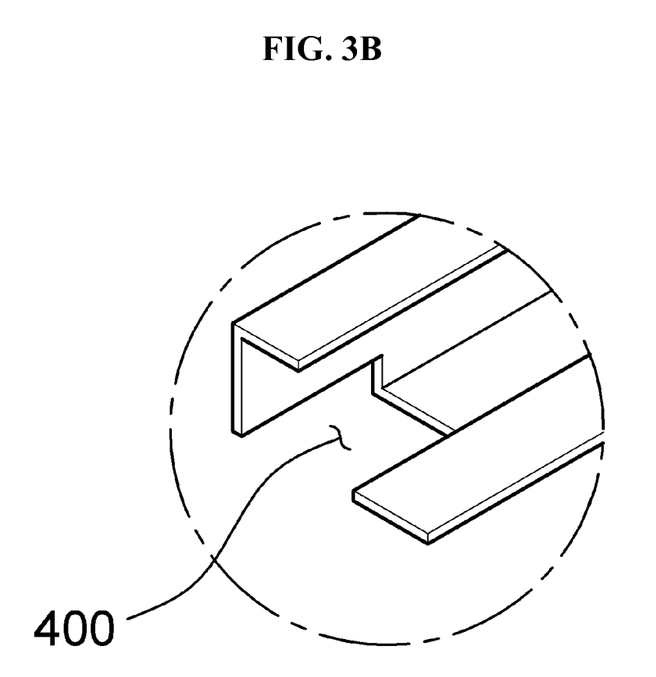
Figure 3C:
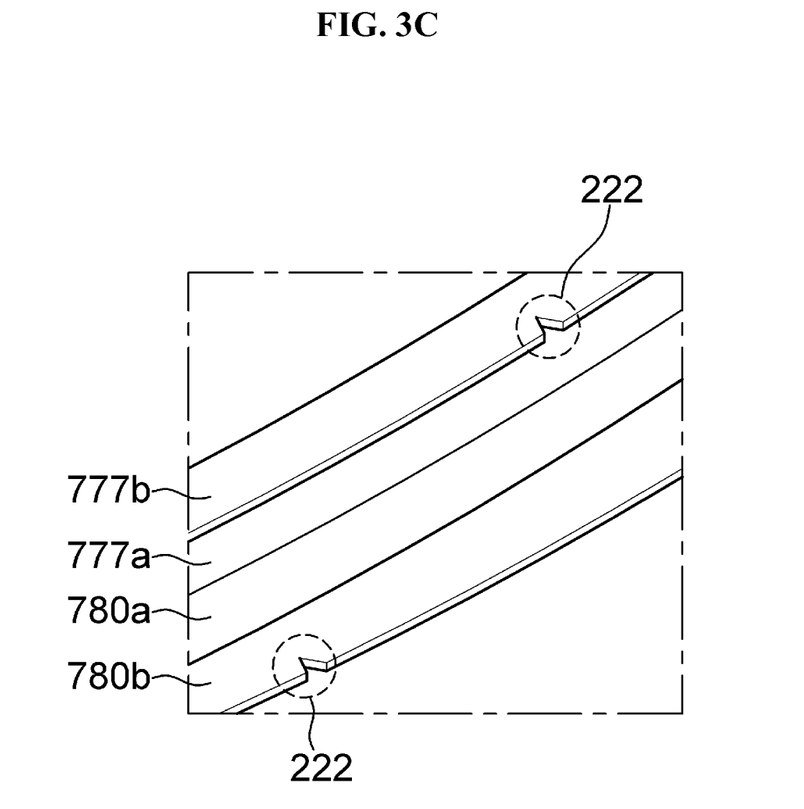

FIG. 3A and FIGS. 3B and 3C are perspective and enlarged views, respectively, showing an exemplary embodiment of the light source cover LC illustrated in FIG. 1. FIG. 3B is an enlarged view of portion A in FIG. 3A, and FIG. 3C is an enlarged view of portion B in FIG. 3A.

As illustrated in FIGS. 3A to 3C, at least one groove 222 may be defined in the light source cover LC. The groove 222 may extend by a predetermined depth from an edge portion of the light source cover LC toward the inside thereof.

In an exemplary embodiment of manufacturing a display device, display module and/or backlight unit, the light source cover LC may be fabricated using a mold. The mold may be first formed to have a groove corresponding to the groove 222 for the fabrication of the light source cover LC having the groove 222. Therefore, the groove 222 may be formed in the light source cover LC fabricated using the mold. In the process of fabricating the light source cover LC, the groove 222 may enable reduction of deformation deviations between inner and outer side surfaces of the light source cover LC. Accordingly, even though the light source cover LC is formed to be curved, a surface of the light source cover LC may be even.

The groove 222 may be formed in the edge portion of the light source cover LC. In an exemplary embodiment, at least one groove 222 may be defined in at least one an edge portion of the upper extending part 777b and/or an edge portion of the lower extending part 777c. With respect to the light source installation part 777a, the groove may extend from a distal edge portion of the upper extending part 777b and/or a distal edge portion of the lower extending part 777c.

Where the lower extending part 777c includes the first horizontal part 780a, the second horizontal part 780b and the inclined part 780c as previously described, the at least one groove 222 may be defined in an edge portion of the second horizontal part 780b among the aforementioned parts of the lower extending part 777c, which is positioned nearest the end portion of the light source cover LC.

The groove 222 may be provided in plural in the light source cover LC. With respect to a length of the light source cover LC, the grooves 222 may be concentrated only in a central portion of the light source cover LC or may be evenly distributed over the whole light source cover LC. The plural grooves 222 may alternate along the length of the light source cover LC, but the invention is not limited thereto.

As illustrated in FIGS. 3A to 3C, the groove 222 may be shaped like a wedge in a plan view. However, the invention is not limited to the wedge-shaped groove. The groove may be formed in various shapes that can reduce deformation deviations of the light source cover LC. In an exemplary embodiment, the groove 222 may have any one shape among a quadrilateral, a circle and a trapezoid instead of the shape of a wedge. Further, where the groove 222 is provided in plural, the plurality of grooves 222 may be different from each other in shape. In an exemplary embodiment, a first portion of the plurality of grooves 222 may be shaped like a wedge and a second portion different from the first portion of the plurality of grooves 222 may have a shape different from the wedge shape such as a shape from among the various shapes described above.

An opening 400 may be defined in one end portion of the light source cover LC, and a connector (not shown) of the PCB 801a may be exposed outwards through the opening 400. The opening 400 may be defined by portions of the light source installation part 777a, the upper extending part 777b and the lower extending part 777c.

From the foregoing, it will be appreciated that various exemplary embodiments of the invention have been described herein for purposes of illustration, and that various modifications may be made without departing from the scope and spirit of the disclosure. Accordingly, the various exemplary embodiments disclosed herein are not intended to limit the scope of the invention, and the true scope and spirit of the invention is indicated by the following claims, and equivalents thereof.

What is claimed is:

1. A backlight unit comprising:
    a light source unit which has a curved shape and emits light;
    a light guide plate comprising a curved light incident surface on which the light emitted from the light source unit is incident; and
    a light source cover which has a curved shape corresponding to the curved light incident surface, and is configured to surround one side of the light guide plate and to dispose the light source unit and the light incident surface inside thereof,
    wherein a groove is defined in the light source cover and extends toward the inside of the light source cover from an edge portion thereof.

2. The backlight unit of claim 1, wherein the groove has a wedge, a circle, a quadrilateral or a trapezoid shape.

3. The backlight unit of claim 1, wherein the light source cover comprises:
    a light source installation part to which the light source unit is mounted;
    an upper extending part extending from an upper side of the light source installation part toward an upper surface of the light guide plate; and
    a lower extending part extending from a lower side of the light source installation part toward a lower surface of the light guide plate.

4. The backlight unit of claim 3, wherein the groove extends from an edge portion of the upper extending part or an edge portion of the lower extending part.

5. The backlight unit of claim 3, wherein the lower extending part comprises:
    a first horizontal part extending from the lower side of the light source installation part;
    a second horizontal part disposed nearer the lower surface of the light guide plate than the first horizontal part; and
    an inclined part configured to couple the first and second horizontal parts to each other.

6. The backlight unit of claim 5, wherein the groove extends from an edge portion of the second horizontal part.

7. The backlight unit of claim 1, wherein the groove is provided in plural and is distributed only in a central portion of the light source cover.

8. The backlight unit of claim 1, wherein the groove is provided in plural and evenly distributed along an entire length of the light source cover.

9. The backlight unit of claim 1, wherein the light source unit comprises:
    a printed circuit board which has a curved shape, and on which a plurality of conductive lines are mounted, the conductive lines configured to transmit drive power from a power supply unit; and
    a light-emitting diode package mounted on the printed circuit board and configured to produce light by the drive power transmitted through the plurality of conductive lines.

10. The backlight unit of claim 9, further comprising an adhesive member between a surface of the printed circuit board and a surface of the light source cover which face each other.

11. The backlight unit of claim 3, wherein
    the groove is provided in plural and extends from an edge portion of the upper extending part,
    the groove is provided in plural and extends from and an edge portion of the lower extending part, and
    the plural grooves in the upper extending part alternate with the plural grooves in the lower extending part, along a length of the curved shape of the light source cover.

12. A display device comprising:
    a backlight unit configured to generate and emit light; and
    a display panel configured to display an image using the light from the backlight unit,
    the backlight unit comprising:
        a light source unit which has a curved shape and emits light;
        a light guide plate comprising a curved light incident surface on which the light emitted from the light source unit is incident; and
        a light source cover which has a curved shape corresponding to the curved light incident surface, and is configured to surround one side of the light guide plate and to dispose the light source unit and the light incident surface inside thereof, wherein a groove is defined in the light source cover and extends toward the inside of the light source cover from an edge portion thereof.

* * * * *